United States Patent [19]

Tsuiki et al.

[11] 3,900,845

[45] Aug. 19, 1975

[54] KEY INPUT CIRCUIT

[75] Inventors: Takao Tsuiki, Kokubunji; Yoshikazu Hatsukano, Kodaira, both of Japan

[73] Assignee: Hitachi, Ltd., Japan

[22] Filed: July 23, 1973

[21] Appl. No.: 381,486

[30] Foreign Application Priority Data

July 21, 1972 Japan .............................. 47-72532

[52] U.S. Cl. ........................ 340/365 E; 340/173 FF

[51] Int. Cl. ............................................ H04l 15/06

[58] Field of Search ................................ 340/365 E

[56] References Cited

UNITED STATES PATENTS

| | | | |
|---|---|---|---|
| 3,493,928 | 2/1970 | Juliusburger | 340/365 E |
| 3,624,645 | 11/1971 | Gluck | 340/365 E |
| 3,683,370 | 8/1972 | Nagano | 340/365 E |
| 3,715,747 | 2/1973 | Hanson | 340/365 E |
| 3,717,871 | 2/1973 | Hatano | 340/365 E |
| 3,720,938 | 3/1973 | Leposavic | 340/365 E |
| 3,740,745 | 6/1973 | Chao | 340/365 E |
| 3,750,160 | 7/1973 | Elzinga | 340/365 E |
| 3,771,130 | 11/1973 | Moses | 340/365 E |

FOREIGN PATENTS OR APPLICATIONS

| | | | |
|---|---|---|---|
| 1,172,882 | 5/1962 | Germany | 340/365 E |

OTHER PUBLICATIONS

IBM Technical Disclosure Bull., Vol. 9, No. 6, November 1966, pp. 586, 587, Keyboard Circuit, L. G. Lankford.

*Primary Examiner*—Thomas B. Habecker
*Attorney, Agent, or Firm*—Craig & Antonelli

[57] ABSTRACT

A key input circuit includes a read control circuit, a memory circuit, and a key signal detector circuit. The memory circuit stores key signals read by the read control circuit. When the key signal detector circuit detects that any key signal has been stored in the memory circuit, it prevents key signals from being thereafter supplied from the read control circuit to the memory circuit. Thus, an erroneous input of the key signal due to simultaneous depression of two or more keys is avoided.

9 Claims, 5 Drawing Figures

| KEY | TIMING SIGNAL | OUTPUT | KEY INFORMATION |
|---|---|---|---|
| K1 | DT1 · TL | 00001 | 1 |
| K2 | DT2 · TL | 00010 | 2 |
| K3 | DT3 · TL | 00011 | 3 |
| K4 | DT4 · TL | 00100 | 4 |
| K5 | DT5 · TL | 00101 | 5 |
| K6 | DT6 · TL | 00110 | 6 |
| K7 | DT7 · TL | 00111 | 7 |
| K8 | DT8 · TL | 01000 | 8 |
| K9 | DT9 · TL | 01001 | 9 |
| K10 | DT10 · TL | 01010 | 10 |

| KEY | TIMING SIGNAL | OUTPUT | KEY INFORMATION |
|---|---|---|---|
| K. | DT1 · TH | 01011 | . |
| Kx | DT2 · TH | 10010 | x |
| K÷ | DT3 · TH | 10011 | ÷ |
| K+ | DT4 · TH | 10100 | + |
| K− | DT5 · TH | 10101 | - |
| K= | DT6 · TH | 10110 | = |
| KMC | DT8 · TH | 11000 | MC |
| KCE | DT9 · TH | 11001 | CE |
| | | | |
| | | | |

KEY INPUT CIRCUIT

BACKGROUND OF THE INVENTION

The present invention relates to a key input circuit for use in electronic equipment or applicances, such as electronic desk calculators.

The key input circuit is used as the input circuit of an electronic desk calculator, an electronic typewriter or the like electronic equipment, and is usually composed of a plurality of push-button switches. Desired key information is inputted to the electronic equipment by sequentially manipulating the push-button switches.

In the case where two or more keys are simultaneously depressed, a key signal equivalent to depression of a key different from the depressed keys is inputted in some mechanisms of the electronic calculator. For example, depression of keys for the numerals "1" and "2" will provide an input for numeral "3" in some cases.

It appears that, in order to prevent such erroneous operation due to the multiple depression of keys, there must be provided means to mechanically prevent multiple key depression. Such means, however, will lead to a complicated construction of the keys and the likelihood of further troubles.

Particularly in case of constructing the principal part of the electronic calculator by the use of an integrated semiconductor circuit (IC), the assemblage of the electronic calculator can be simplified and the cost can be lowered when the erroneous input preventing means is electrically constructed and is assembled into the IC by taking advantage of the feature of an IC that a slight increase in the number of logical gates will cause little change in the number of steps of manufacture of the IC.

SUMMARY OF THE INVENTION

It is an object of the present invention to provide a key input circuit which prevents an erroneous input due to multiple depression of keys.

Another object of the present invention is to provide a key input circuit in which, when a plurality of keys are depressed at the same time, only one key signal is produced as an input in conformity with specified priority levels.

Another object of the present invention is to provide a key input circuit which can easily increase the number of keys without adding to the read control circuit, which is already composed of a large number of gate circuits.

Another object of the present invention is to provide a key input circuit which can generate a large quantity of key information without adding to the required number of timing pulses and can operate with a small number of timing pulses.

Another object of the present invention is to provide a key input circuit which reduces the number of input terminals from a key block to an integrated circuit by substituting a plurality of timing pulses for the information of a key.

Still another object of the present invention is to provide a key input circuit in which the construction of a read control circuit for key signals is made simple.

DESCRIPTION OF THE PREFERRED EMBODIMENT

An embodiment of the key input circuit according to the present invention will be described in detail hereunder with reference to the accompanying drawings.

Figures 1, 1A:
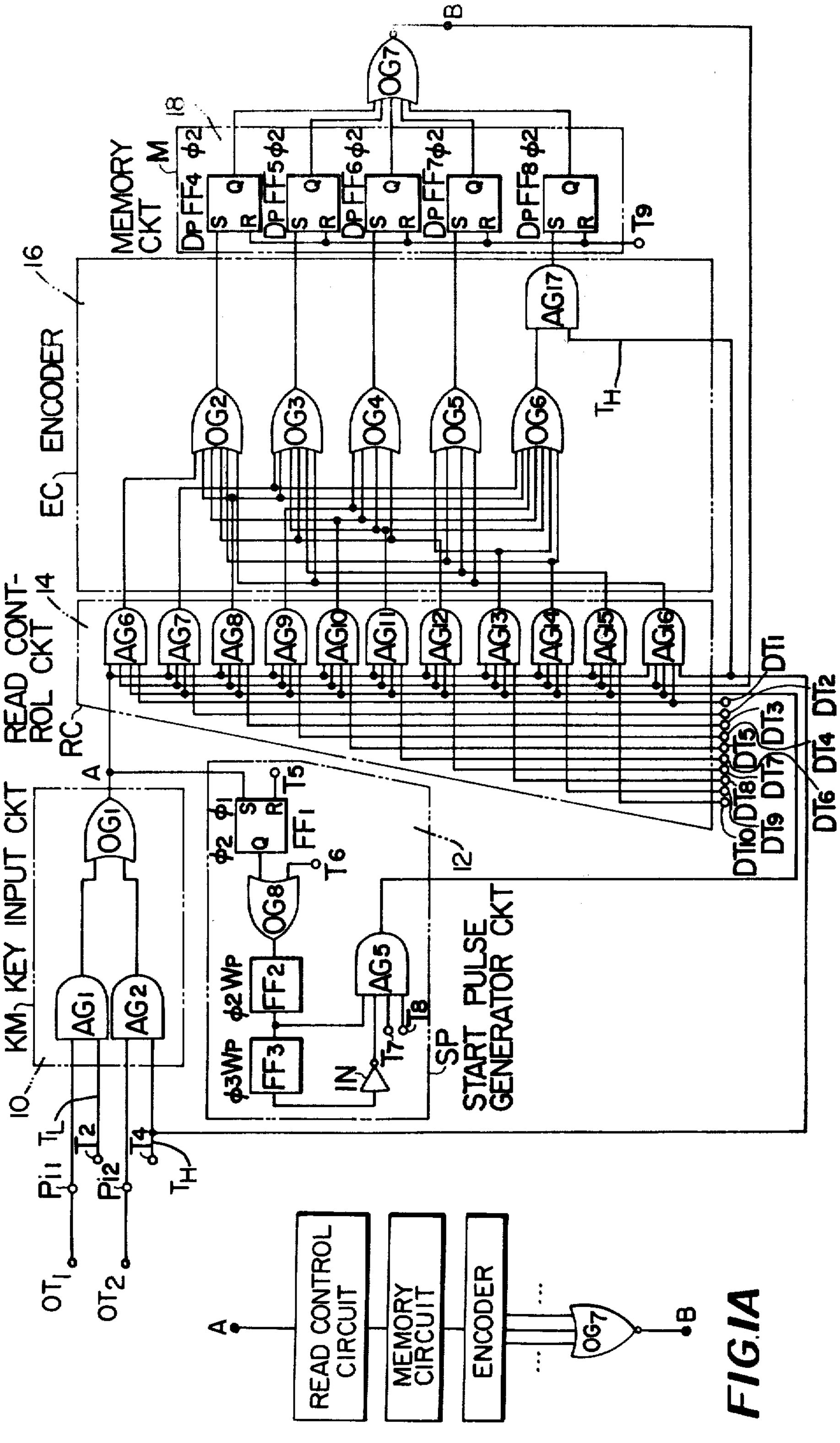
FIG. 1 is a circuit diagram showing an embodiment of a key input circuit according to the present invention.
FIG. 1A is a diagram showing an alternative embodiment of the invention.

FIG. 1 is a circuit diagram showing the embodiment of the key input circuit according to the present invention. In the figure, $Pi_1$ and $Pi_2$ designate external input terminals of an integrated semiconductor circuit, part of which is constituted of a key input multiplexor circuit 10 or KM, a NOR circuit $OG_7$, a start pulse generator circuit 12 or SP, a read control circuit 14 or RC, an encoder 16 or EC and a memory circuit 18 or M as will be hereinafter described.

Each of AND gates $AG_1$ and $AG_2$ has a multiplexed key signal supplied through the terminal $Pi_1$ or $Pi_2$ to its one input terminal. To the other input terminals of the AND gates $AG_1$ and $AG_2$, timing pulses $T_L$ and $T_H$ shown in FIG. 3 are respectively fed from a conventional timing pulse generator 20 shown in FIG. 2. An OR gate $OG_1$ receives outputs of the AND gates $AG_1$ and $AG_2$ as its inputs. These gate circuits construct the key signal multiplexing portion KM. The external input terminals $Pi_1$ and $Pi_2$ are respectively connected to an output terminal $OT_1$ of a numeral key block $KB_1$ and an output terminal $OT_2$ of a function key block $KB_2$ in FIG. 2, both the key blocks receiving as their inputs digit pulses $DT_1 - DT_{10}$ (refer to FIG. 3), which are supplied from the timing pulse generator 20 shown in FIG. 2. As stated above, the terminals $T_2$ and $T_4$ are supplied with sector pulses $T_L$ and $T_H$ which, as shown in FIG. 3, are made on the basis of the digit signal $DT_1$ and are opposite in phase to each other. In FIG. 3, the upper level of each signal represents the logic "1," and the lower level the logic "0."

Shown at $FF_1$ in FIG. 1 is a flip-flop circuit which is set by an output of the key signal mulitplexing portion KM. The flip-flop circuit $FF_1$ is reset by a timing pulse $T_H \cdot DT_{10} \cdot BT_4$ which is supplied to a terminal $T_5$ and which is made on the basis of the sector pulse $T_H$, the digit pulse $DT_{10}$ and a bit pulse $BT_4$. An OR gate $OG_8$ receives as its inputs an output of the flip-flop circuit $FF_1$ and an auto-clear signal supplied to a terminal $T_6$. Flip-flop circuits $FF_2$ and $FF_3$ are connected in cascade to the output terminal of the OR gate $OG_8$. An inverter IN is connected to the output end of the flip-flop circuit $FF_3$, and an AND gate $AG_5$ receives as its inputs an output signal of the flip-flop circuit $FF_2$, an output signal of the inverter IN and signals fed to terminals $T_7$ and $T_8$. These components $FF_1$, $OG_8$, $FF_2$, $FF_3$, IN and $AG_5$ form the start pulse generator circuit SP. The signals supplied to the input terminals $T_7$ and $T_8$ of the AND gate $AG_5$ are key input blocking signals provided for overflow and during operation, respectively.

$AG_6$ – $AG_{16}$ indicate AND gates, each of which receives as its inputs the output of the key signal multiplexing portion KM, an output of the start pulse generator circuit SP, an output of a NOR circuit $OG_7$ and the corresponding one of the digit pulses $DT_1$ – $DT_{10}$, and which constitute the key signal reading circuit RC.

The encoder EC receives outputs of the AND gates $AG_6$ –$AG_{16}$ of the key signal reading circuit as its inputs, and converts them into a parallel binary-coded signal of 5 bits. It is composed of five OR gates $OG_2$ – $OG_6$. The AND gate $AG_{16}$ is additionally supplied with the timing pulse $T_H$ as a control input signal. $AG_{17}$ represents an AND gate which receives as its inputs an output of the OR gate $OG_6$ and the sector pulse $T_H$. $FF_4$ – $FF_8$ indicate flip-flop circuits which are set by outputs of the OR gates $OG_2$ – $OG_5$ and an output of the AND gate $AG_{17}$, respectively. The flip-flop circuits $FF_4$ – $FF_8$ form the memory M. Outputs $OT_3$ – $OT_7$ of the respective flip-flops $FF_4$ – $FF_8$ are connected to an arithmetic circuit (not shown). As reset inputs R of the flip-flop circuits $FF_4$ – $FF_8$, there are provided the output signal of the start pulse generator circuit SP and a clear signal. All the flip-flop circuits $FF_1$ – $FF_4$ are those of the two-phase clock control type. The write operation of the flip-flop circuits is performed when a clock pulse $\phi_1$, a digit pulse $Dp$ and a word pulse $Wp$, as shown in FIG. 3, become "0." The read operation is conducted when a clock pulse $\phi_2$ becomes "0."

The NOR gate $OG_7$ receives outputs of the flip-flop circuits $FF_4$ – $FF_8$ as its inputs, and controls the opening and closure of the AND gates $AG_6$ – $AG_{16}$ by its output signal. The NOR gate $OG_7$ forms a key signal detector circuit.

The operation of the key input circuit thus constructed will now be explained.

1. Key Blocks $KB_1$ and $KB_2$

Figures 2, 4:
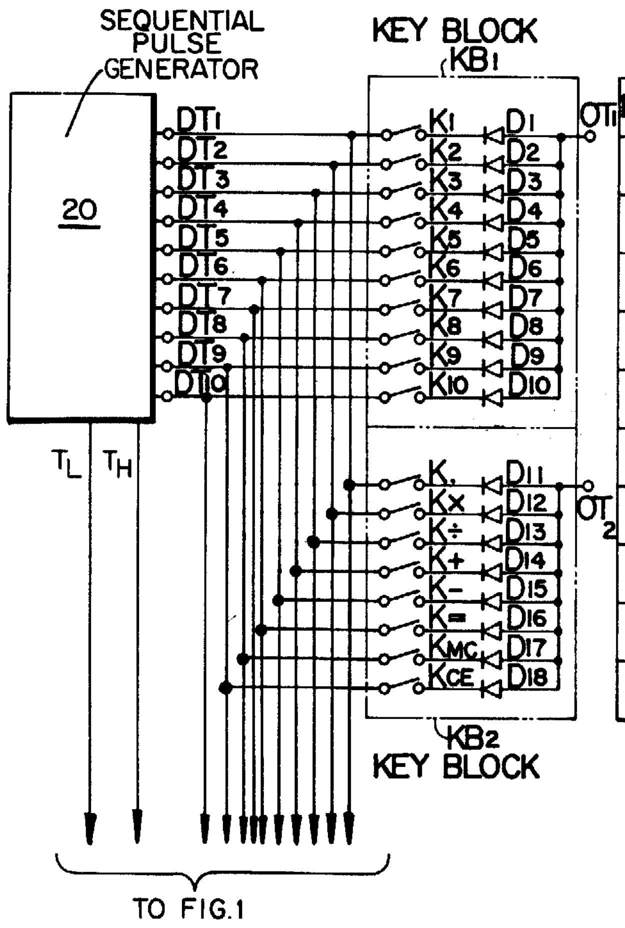
FIG. 2 is a connection diagram of key switches to be connected on the input side of the circuit shown in FIG. 1.
FIG. 4 is a table listing the relations between key information and output signals.
Figure 3:
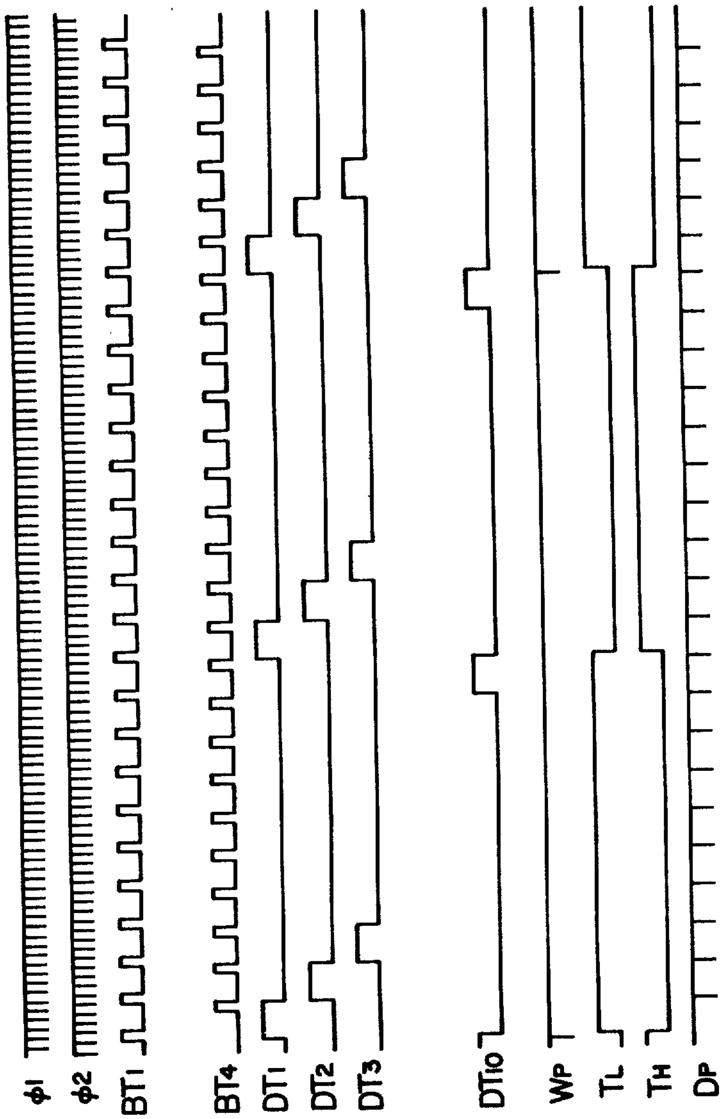
FIG. 3 is a waveform diagram of pulse signals for use in the key input circuit shown in FIG. 1.

The sequential timing pulses $DT_1$ – $DT_{10}$ are fed to the left terminals of the respective keys of the key block $KB_1$, as seen in FIG. 2. Then, when any key is closed, the timing pulses fed to the closed key appear at the output terminal $OT_1$ of the key block $KB_1$. For example, when the numeral key $K_5$ is closed, the timing pulses $DT_5$ appear at the output terminal $OT_1$.

Similarly, when any key of the key block $KB_2$ is closed, the sequential timing pulses supplied to the closed key appear at the output terminal $OT_2$.

Accordingly, information as to which keys have been closed are represented by the timing pulses $DT_1$ – $DT_{10}$. The information is united into one output in each key block (multiplexed). The key signal thus multiplexed becomes an input signal of the key signal multiplexor circuit KM, as explained below.

2. Key Signal Multiplexor Circuit KM

The AND circuits $AG_1$ and $AG_2$ receive as control signals the timing pulses $T_L$ and $T_H$, respectively. When the timing pulses $T_L$ and $T_H$ become "1," the gates of the respective AND circuits are opened. The OR circuit $OG_1$ functions to form into one output the signals which are controlled by the timing pulses $T_L$ and $T_H$ in this manner.

Accordingly, the key signal generated in the key block $KB_1$ can pass through the key signal multiplexing circuit KM only when the timing pulses $T_L$ is "1." The key signal produced in the key block $KB_2$ can pass through the circuit KM only when the timing pulse $T_H$ is "1."

In summary, the key signal multiplexing circuit KM functions so that the key signals multiplexed by the key blocks $KB_1$ and $KB_2$ may be distinguished therebetween in time and so that they may be further multiplexed. Thus far, the information of the respective keys are converted into timing pulses of logical expressions, as given in FIG. 4.

3. Start Pulse Generator Circuit SP

A detailed explanation of the operation will be omitted, and only essential points will be described. The start pulse generator circuit SP generates a start pulse signal for determining a period in which the key signal is read out.

For example, in the case where the numeral key $K_3$ is kept depressed, timing pulses of $DT_3 \cdot T_L$ appear on the output side of the key input signal multiplexing circuit KM during such period. If a pulse signal corresponding thereto is indefinitely fed into, for example, a register of the calculator, the contents of all the digits of the register will become "3." The start pulse signal prescribes the read period for the key signal so as to avoid such inconvenience, and is generated for every depression of the key.

The start pulse signal is employed as a control signal of the read control circuit RC and the memory circuit M hereinbelow described.

4. Read Control Circuit RC

Each time the start pulse is generated, the AND circuits $AG_6$ – $AG_{15}$ of the read control circuit RC detect what key signals are contained in the multiplexed key signal fed from the key signal multiplexing circuit KM. For example, when the output of the AND circuit $AG_7$ becomes "1," it is made known that the numeral key $K_2$ or function key $K_x$ has been closed.

The AND circuit $AG_{16}$ is especially provided in the embodiment. It detects whether or not the timing pulse $DT_1 \cdot T_H$ is included in the multiplexed key signal, namely, whether or not a decimal point key K. has been depressed. This is intentionally provided to dispose, for convenience' sake, the decimal point key K. along with the numeral keys $K_1$ – $K_{10}$ by considering it as being separate from the function keys.

5. Encoder EC

The encoder EC codes into binary numbers the key signals which have been detected and converted into the timing pulses $DT_1$ – $DT_{10}$ by the read control circuit RC. For example, the key signal converted into the timing pulse $DT_2$ is coded into "0010" by the OR circuits to the fourth bit (in the output sequence of from the OR circuit $OG_5$ to that $OG_2$).

Here, the output stage of the encoder EC at the fifth bit, namely, the AND circuit $AG_{17}$ discriminates between the key signals of the numeral key block $KB_1$ and the function key block $KB_2$. More specifically, the AND circuit $AG_{17}$ opens its gate only when the timing pulse $T_H$ is "1," and does not open its gate when the timing pulse $T_L$ is "0." Therefore, the output "1" of the AND circuit $AG_{17}$ makes shown that any key included in the numeral key block $KB_1$ has been depressed, while the output "1" makes known that any key located in the function key block $KB_2$ has been depressed. Accordingly, when, for example, the numeral key $K_2$ is depressed, the output of the encoder becomes "00010." When the function key $K_x$ is depressed, it becomes "10010."

The above relations are listed in FIG. 4.

6. Memory Circuit M

The key signals thus derived from the encoder EC differ in phase in dependence on the depressed keys, so that the phases need be made uniform. The memory circuit M is employed for such purpose, namely to store the outputs of the encoder EC.

When it is necessary to clear the contents of the whole calculator, when a key has been erroneously depressed, and when a key is to be depressed anew, the memory circuit M must eliminate key signals already stored therein. To this end, the clear signal and the start pulse signal are used as the reset input of the memory circuit M.

7. Key Signal Detector Circuit (NOR circuit $OG_7$)

When at least one of input signals of the NOR circuit $OG_7$ becomes "1," that is, when any key information is stored in the memory circuit M, the output of the NOR circuit $OG_7$ becomes "0."

Thus, the NOR circuit $OG_7$ detects whether or not any key signal or signals have been stored in the memory circuit M. In the case where the signal or signals have been stored, the NOR circuit closes the gates of the AND circuits $AG_6 - AG_{16}$ of the read control circuit RC, and prevents the subsequent key signals from being fed to the encoder EC.

Here, as previously stated, the key signal passes through the read control circuit RC and is fed to the encoder EC, when the start pulse is generated. The start pulse is produced in a time interval equivalent to the period of the word pulses $W_p$ ($W_p = T_H \cdot DT_{10} \cdot BT_4 \cdot \overline{\phi}_1$) after the time at which $T_L \cdot DT_1 \cdot BT_1 \cdot \overline{\phi}_2$ becomes "1." Accordingly, the read control circuit RC transmits into the encoder EC the key signals of the numeral key block $KB_1$, multiplexed by the timing pulse $T_L$, earlier than the key signals of the function key block $KB_2$, multiplexed by the timing pulse $T_H$. The key signals multiplexed by the timing pulses $DT_1 - DT_{10}$ are transmitted into the encoder EC in a sequence beginning with the timing pulse $DT_1$ and ending with pulse $DT_{10}$. In consequence, in the case where a plurality of keys are simultaneously depressed, only one key signal is inputted in such manner that the numeral key takes precedence over the function key. Among numeral keys, one of smaller value is preferential, and only one numeral key signal is inputted.

Although, in the foregoing embodiment, description has been made of the case where the output of the encoder EC is stored in the memory M, the present invention is not restricted to the exemplified case. Even when the memory is arranged between the read control portion RC and the encoder EC, as shown in FIG. 1A, a similar effect is achieved.

Although, in the embodiment, description has been made of the case where the two key blocks consisting of the numeral setting key block and the function key block are employed, the invention is not restricted thereto.

As described above, the key input circuit according to the present invention is so constructed that key signals are multiplexed by timing pulses (digit pulses), that outputs of a key block unit divided into blocks of numeral setting keys, function keys, etc., are multiplexed by timing pulses longer in period than the first-mentioned timing pulses, and that this first information multiplexed is supplied to an integrated circuit. Therefore, the number of input pins to the integrated circuit and the number of timing pulse series are extremely small as compared with the number of keys. The key input circuit according to the described embodiment requires only one read control portion for the two key blocks, so that the construction is extremely simple.

Moreover, according to the key input circuit of the present invention, signals stored in a memory circuit M are detected by a key signal detector circuit, and gates of the read control circuit are closed by an output of the key signal detector circuit, so as to block key signals subsequently arriving. Therefore, the erroneous input of the key signal is prevented.

What is claimed is:

1. A key input circuit comprising key controlled means for providing respective key signals representing selective key actuation, said key controlled means comprising a plurality of keys, timing pulse generator means for generating a series of sequential timing pulses and means for applying a respective timing pulse to one terminal of each of said keys, another terminal of each of said keys being connected together to a common terminal providing said key signals; read control circuit means responsive to said key signals for generating respective output signals, said read control circuit means comprising a plurality of AND gates each directly receiving the output of said common terminal, a respective one of said timing pulses and a control signal; and gate means responsive to said output signals for generating said control signal to inhibit further operation of said read control circuit means.

2. A key input circuit as defined in claim 1, further comprising memory means for storing said output signals, said gate means being connected to receive the data stored in said memory means.

3. A key input circuit as defined in claim 2, further comprising encoder means connected between said read control circuit means and said memory means for converting said output signals to a predetermined binary code.

4. A key input circuit as defined in claim 3, wherein said encoder means comprises a plurality of logic gates receiving said output signals from said read control circuit means, and an AND gate receiving the output from one of said logic gates and a timing pulse from said timing pulse generator means having a pulse width not shorter than one of said sequential timing pulses, the outputs of the other of said logic gates and said AND gate being applied to said memory means.

5. A key input circuits as defined in claim 2, further comprising encoder means connected between said memory means and said gate means for converting said output signals to a predetermined binary code.

6. A key input circuit as defined in claim 2, wherein said read control circuit means comprises an additional plurality of keys each having a respective timing pulse applied to one terminal thereof and having another terminal thereof connected to an additional common terminal providing additional key signals, and further including key input means for connecting said common terminal and said additional common terminal to said read control circuit means during alternate time periods equal to a full sequence of said timing pulses.

7. A key input circuit as defined in claim 6, further comprising start pulse generator means responsive to the output of said key input means for generating a start pulse and means for applying said start pulse in common to all of the AND gates of said read control circuit means.

8. A key input circuit as defined in claim 1, wherein said key controlled means is a multiplexing circuit for time dividing said key signals on a common output and said read control circuit means is a de-multiplexer for providing said output signals on respective outputs.

9. A key input circuit comprising a plurality of keys, the output terminals of which are connected in common, read control circuit means comprising a plurality of AND gates each receiving the output of said commonly connected output terminals of the keys, memory circuit means receiving and storing a key signal indicative of the outputs of said read control circuit means, gate means having its input connected to said memory circuit means, its output connected to respective inputs of all of said AND gates and being responsive to any key signal stored in the memory circuit for closing the AND gates when a key signal is stored in said memory circuit means.

* * * * *